United States Patent
Jeong et al.

(10) Patent No.: US 10,106,051 B2
(45) Date of Patent: Oct. 23, 2018

(54) STATE DIAGNOSTIC APPARATUS OF FUEL CELL STACK

(71) Applicant: Hyundai Motor Company, Seoul (KR)

(72) Inventors: Kwi Seong Jeong, Gyeonggi-Do (KR); Sang Bok Won, Seoul (KR); Young Bum Kum, Seoul (KR); Jae Jun Ko, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 842 days.

(21) Appl. No.: 14/562,718

(22) Filed: Dec. 7, 2014

(65) Prior Publication Data

US 2016/0093903 A1    Mar. 31, 2016

(30) Foreign Application Priority Data

Sep. 26, 2014    (KR) .................. 10-2014-0128904

(51) Int. Cl.
| | |
|---|---|
| *H01M 8/04* | (2016.01) |
| *B60L 11/18* | (2006.01) |
| *H01M 8/04537* | (2016.01) |
| *H01M 8/04664* | (2016.01) |

(52) U.S. Cl.
CPC ..... *B60L 11/1881* (2013.01); *H01M 8/04559* (2013.01); *H01M 8/04679* (2013.01); *H01M 2250/20* (2013.01); *Y02T 90/32* (2013.01)

(58) Field of Classification Search
CPC ........... B60L 11/1881; H01M 2250/20; H01M 8/04559; H01M 8/04679; Y02T 90/32
See application file for complete search history.

(56) References Cited

U.S. PATENT DOCUMENTS

| | | | |
|---|---|---|---|
| 2004/0220752 A1* | 11/2004 | Gopal | ................ G01R 31/3658 702/31 |
| 2010/0161259 A1 | 6/2010 | Kim et al. | |
| 2012/0135327 A1 | 5/2012 | Jeong et al. | |
| 2014/0162157 A1 | 6/2014 | Jeong et al. | |

FOREIGN PATENT DOCUMENTS

| | | |
|---|---|---|
| KR | 10-2009-0023051 A | 3/2009 |
| KR | 10-1090705 B1 | 12/2011 |
| KR | 10-1308254 B1 | 9/2013 |
| KR | 10-2013-0122382 A | 11/2013 |
| KR | 10-1359839 B1 | 2/2014 |
| KR | 2014-0075982 A | 6/2014 |

* cited by examiner

*Primary Examiner* — Lingwen R Zeng
(74) *Attorney, Agent, or Firm* — Mintz Levin Cohn Ferris Glovsky and Popeo, P.C.; Peter F. Corless

(57) ABSTRACT

An apparatus for diagnosing a state of a fuel cell stack is provided. The apparatus may diagnose the state of the fuel cell stack without including the DC-DC converter which boosts the DC voltage and the inverter which converts the boosted DC voltage into the AC voltage. In particular, the apparatus may diagnose the state of the fuel cell by applying the rectangular wave of the single frequency having a duty ration of about 0.5 to the fuel cell stack, measuring the voltage of the fuel cell stack, detecting the even multiple harmonic component of the frequency of the rectangular wave by performing the frequency conversion on the measured voltage, and then diagnosing the state of the fuel cell stack based on the magnitude of the detected harmonic component.

10 Claims, 7 Drawing Sheets

STATE DIAGNOSTIC APPARATUS OF FUEL CELL STACK

CROSS-REFERENCE TO RELATED APPLICATION

This application is based on and claims the benefit of priority to Korean Patent Application No. 10-2014-0128904, filed on Sep. 26, 2014 in the Korean Intellectual Property Office, the entire contents of which is incorporated herein by reference.

TECHNICAL FIELD

The present invention relates to an apparatus for diagnosing a state of a fuel cell stack, particularly, without using a sine wave of a multi frequency.

BACKGROUND

A fuel cell is a power generation device which converts chemical energy of a fuel into electrical energy by a electrochemical reaction within a fuel cell stack without combusting the fuel. The fuel cell may be used to supply power for an industry, a household, and vehicle driving and further to supply power to small electric/electronic products, in particular, portable devices.

Currently, as a power supply source for driving a vehicle, a polymer electrolyte membrane fuel cell (PEMFC) and a proton exchange membrane fuel cell (PEMFC) type which may have the greatest power density among the fuel cells have been developed. In particular, the polymer electrolyte membrane fuel cell and the proton exchange membrane fuel cell (PEMFC) may have a rapid starting time and a rapid power conversion reaction time due to their low operating temperature.

The polymer electrolyte membrane fuel cell typically include: a membrane electrode assembly (MEA) including catalytic electrode layers where the electrochemical reaction is generated and a solid polymer electrolyte membrane where protons passes and the catalytic electrode layers are attached; a gas diffusion layer (GDL) which serves to uniformly distribute reaction gases and transfer generated electrical energy; a gasket and a fastener which maintain air tightness and proper fastening pressure of the reaction gases and cooling water; and a bipolar plate where the reaction gases and the cooling water pass.

In an assembly of the fuel cell stack, a combination of the membrane electrode assembly and the gas diffusion layer is positioned at the innermost portion of the cell as major components. In the membrane electrode assembly, the catalytic electrode layers such as an anode and a cathode where a catalyst is disposed are provided for reaction sites of hydrogen and oxygen at both surfaces of the polymer electrolyte membrane, and an outer portion where the anode and the cathode are positioned is stacked with the gas diffusion layer, a gasket, and the like.

An outer portion of the gas diffusion layer is supplied with reaction gas such as hydrogen as fuel and oxygen or air as oxidizer and the outer portion of the gas diffusion layer is provided with a bipolar plate formed with a flow field where cooling water or air may pass.

A plurality of unit cells are stacked with unit cells, and then the outermost portion thereof is coupled with a current collector, an insulating plate, and an end plate for supporting the stacked cells, and the unit cells between the end plates are repeatedly stacked and fastened, thereby forming the fuel cell stack.

To obtain necessary potential in an actual vehicle, the number of the unit cells may vary based on potential required and stacking the unit cells may form a stack. Since potential generated from one unit cell is about 1.3 V, a plurality of cells are stacked in series to produce power required to drive a vehicle.

Meanwhile, in the fuel cell vehicle, an output voltage of the stack may be used to diagnose a state of the fuel cell.

The typical apparatus of diagnosing a state of a fuel cell stack in the related arts applies a sine wave (AC) of a multi frequency to the fuel cell stack and then measures a voltage of the fuel cell stack, detects a harmonic component by performing frequency conversion on the measured voltage, and then diagnoses the state of the fuel cell stack based on a magnitude of the harmonic component.

The typical state diagnostic apparatus of a fuel cell stack essentially includes a DC-DC converter which boosts a DC voltage and an inverter which converts the boosted DC voltage into an AC voltage such that a DC of the fuel cell stack may be overlapped with the AC current. However, the detection and diagnosis may be complicated configuration and thus expensive.

SUMMARY

The present invention provides technical solutions to above mentioned technical difficulties in the related art.

In one aspect, an apparatus for diagnosing a state of a fuel cell stack is provided and the apparatus may diagnose a state of the fuel cell stack without including a DC-DC converter which boosts a DC voltage and an inverter which converts the boosted DC voltage into an AC voltage. In particular, the apparatus may diagnose the state of the fuel cell stack by applying a rectangular wave of a single frequency having a duty ratio of about 0.5 to the fuel cell stack, measuring a voltage of the fuel cell stack, detecting even multiple harmonic components of a frequency of the rectangular wave by performing frequency conversion on the measured voltage, and then diagnosing the state of the fuel cell stack based on a magnitude of the detected harmonic components.

According to an exemplary embodiment of the present invention, the apparatus for diagnosing the state of a fuel cell stack may include: a driver configured to turn on and off a power transistor based on a driving frequency; the power transistor configured to be driven based on a control of the driver such that a rectangular wave current component of a single frequency having a duty ratio of about 0.5 is included in a current of the fuel cell stack; and a diagnostic controller configured to set the driving frequency, measure a voltage of the fuel cell stack and convert the voltage into a frequency such that even multiple harmonic components of the rectangular wave frequency may be detected, and diagnose a state of the fuel cell stack based on a magnitude of the detected harmonic components.

In an exemplary embodiment of the present invention, a state diagnostic apparatus of a fuel cell stack may include: a rectangular wave generator configured to generate a rectangular wave of a single frequency having a duty ratio of about 0.5; a power transistor configured to be driven depending on a rectangular wave output from the rectangular wave generator such that a rectangular wave current component of a single frequency having a duty ratio of about 0.5 may be included in a current of the fuel cell stack; and a diagnostic controller configured to set a frequency and an amplitude value of the rectangular wave, measure a voltage of the fuel cell stack and then convert the voltage into a frequency such that even multiple harmonic components of the rectangular wave frequency may be detected, and diagnose a state of the fuel cell stack based on a magnitude of the detected harmonic components.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The foregoing objects, features and advantages will become more apparent from the following description of exemplary embodiments of the present disclosure with reference to accompanying drawings, which are set forth hereinafter. Accordingly, those having ordinary knowledge in the related art to which the present disclosure pertains will easily embody technical ideas or spirit of the present invention. Further, when technical configurations known in the related art are considered to make the contents obscure in the present invention, the detailed description thereof will be omitted. Hereinafter, exemplary embodiments of the present invention will be described in detail with reference to the accompanying drawings.

Figure 1:
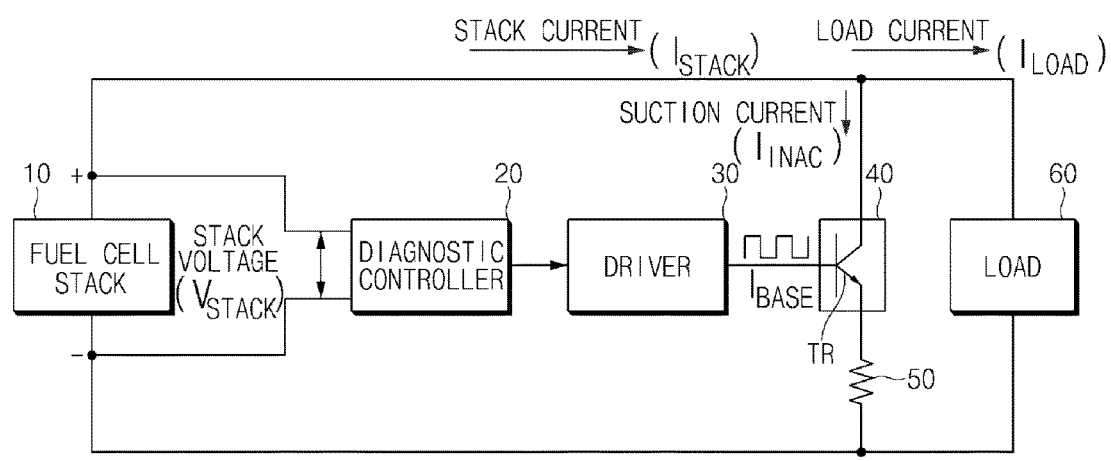
FIG. 1 illustrates an exemplary apparatus for diagnosing a state of a fuel cell stack according to an exemplary embodiment of the present invention.

FIG. 1 illustrates an exemplary apparatus for diagnosing a state of a fuel cell stack according to an exemplary embodiment of the present invention.

As illustrated in FIG. 1, a state diagnostic apparatus of a fuel cell stack according to an exemplary embodiment of the present invention includes a fuel cell stack 10, a diagnostic controller 20, a driver 30, a power transistor 40, a resistor 50, and a load 60.

As described herein, the fuel cell stack 10 supplies power to the load 60. The load 60 refers to a part which is operated by receiving power from a motor, a motor controller, and the fuel cell stack 10 which are included in a fuel cell vehicle, and the like.

The diagnostic controller 20 may determine a driving frequency of the driver 30. As used herein, the driving frequency refers to a driving frequency for diagnosing a stack having a duty ratio of about 0.5.

The driver 30 may turn on/off the power transistor 40 under the control of the diagnostic controller 20. In particular, the driver 30 may apply or cut off a current having a duty ratio of about 0.5 to a base B of the power transistor 40 based on the driving frequency set by the diagnostic controller 20.

When the power transistor 40 is turned on by the driver 30, a suction current $I_{INAc}$ may flow from a collector C to an emitter E and when the power transistor 40 is turned off by the driver, the suction current $I_{INAC}$ may not flow from the collector C to the emitter E. As used herein, the suction current input to the collector C refers to a current split from a stack current $I_{STACK}$ supplied from the fuel cell stack 10 and the load current $I_{LOAD}$ may be a current value obtained by subtracting the suction current from the stack current. An emitter terminal may be connected to the resistor 50.

By repeating the process of applying and cutting off the suction current at the same time interval by the power transistor 40, the rectangular wave of the single frequency having the duty ratio of about 0.5 may be applied to the fuel cell stack 10.

Hereinafter, the rectangular wave of the single frequency having the duty ratio of about 0.5 will be described with reference to FIG. 2.

Figure 2:
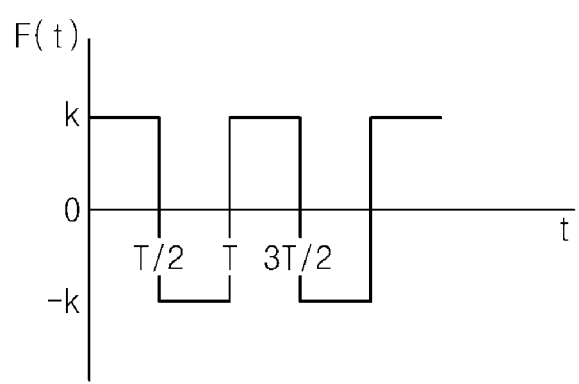
FIG. 2 shows an exemplary rectangular wave of a single frequency having a duty ratio of about 0.5 in an exemplary embodiment of the present invention.

As illustrated in FIG. 2, the rectangular wave of the single frequency may have the duty ratio of about 0.5, a period of T, an amplitude of 2 k, and a frequency of ω. When the rectangular wave of the single frequency is subjected to Fourier transform, the rectangular wave may be represented by odd multiple (ω, 3ω, 5ω, 7ω, . . . ) components of a frequency ω of the rectangular wave as represented by Equation 1.

Therefore, when the rectangular wave current of the single frequency having the duty ratio of about 0.5 is applied to the fuel cell stack 10, the rectangular wave current corresponding to an odd multiple of the applied frequency may be applied.

$$F(t) = \frac{4k}{\pi}\left(\sin wt + \frac{1}{3}\sin 3wt + \frac{1}{5}\sin 5wt ...\right) \qquad \text{[Equation 1]}$$

In Equation 1, t refers to a time and k refers to a constant.

Meanwhile, the diagnostic controller 20 may measure the voltage of the fuel cell stack 10, and then convert the measured voltage into a frequency to detect even multiple harmonic component of the rectangular wave frequency and diagnose the state of the fuel cell stack 10 based on a magnitude of the detected harmonic components.

Hereinafter, multiple harmonic components of the rectangular wave frequency used to diagnose the fuel cell stack 10 will be described with reference to FIGS. 3 and 4.

Figure 3:
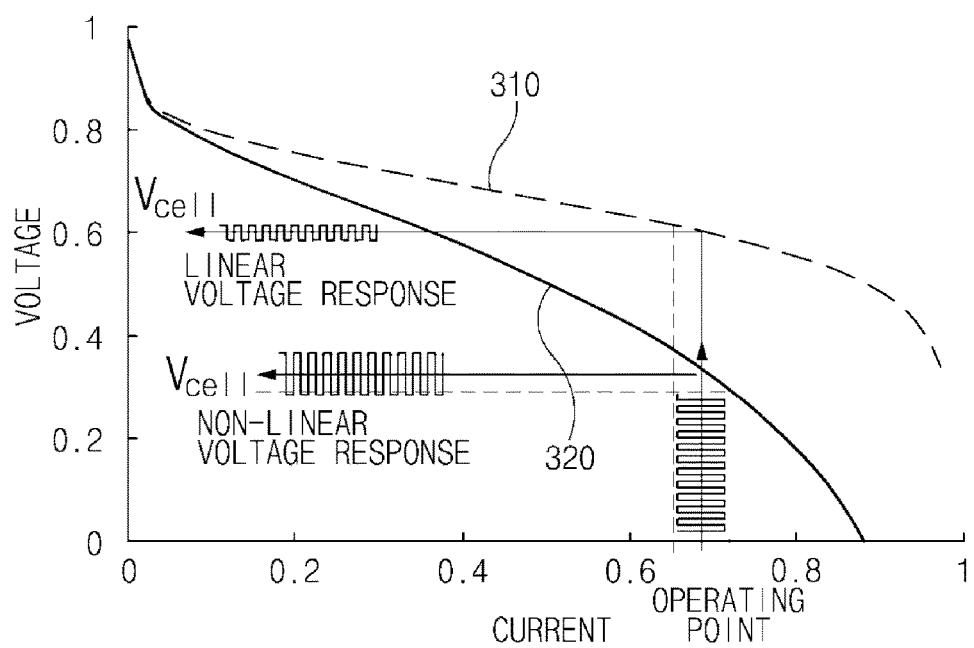
FIG. 3 shows an exemplary graph of voltage and current characteristic curves of the fuel cell stack where the rectangular wave of a single frequency having a duty ratio of about 0.5 is applied in an exemplary embodiment of the present invention.

FIG. 3 shows an exemplary graph of voltage and current characteristic curves of the fuel cell stack to which the rectangular wave of a single frequency having a duty ratio of about 0.5 is applied in an exemplary embodiment of the present invention.

Figure 4:
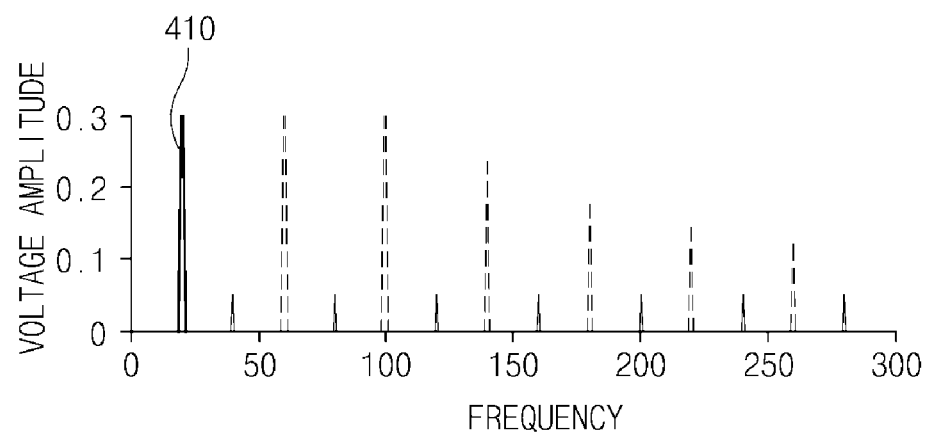
FIG. 4 shows an exemplary amplitude diagram obtained by performing frequency conversion on a voltage of the fuel cell stack of FIG. 3 in an exemplary embodiment of the present invention.

FIG. 4 illustrates an exemplary amplitude diagram obtained by performing frequency conversion on a voltage of the fuel cell stack of FIG. 3.

As illustrated in FIG. 3, a voltage 310 of a normal cell may be changed in a linear section and a voltage 320 of an abnormal cell may be changed in a non-linear section.

A sudden voltage drop of the cell may occur due to a defect of the cell and when the cell is applied with the rectangular wave (diagnostic current) of the single frequency having a duty ratio of 0.5, a non-linear response signal where the even multiple harmonic of the applied frequency or rectangular wave frequency is sensed only in the abnormal cell may appear (FIG. 4). In FIG. 4, reference numeral '410' refers to an input frequency, a solid line other than reference numeral '410' refers to a non-linear harmonic, and a dotted line refers to a rectangular component.

Therefore, the cell state including normal or abnormal cell state may be diagnosed based on a determination whether the even multiple harmonic components of the rectangular wave frequency are present and the magnitude of the even multiple harmonic components of the rectangular wave frequency.

Accordingly, the voltage of the normal cell may have a small magnitude of the even multiple harmonic components of the rectangular wave frequency due to the change in current, but the voltage of the abnormal cell may have the large magnitude of the even multiple harmonic components of the rectangular wave frequency due to the current change.

Consequently, the voltage of the fuel cell stack may be measured as a sum of the voltage of the normal cell and the voltage of the abnormal cell and the state of the fuel cell stack may be diagnosed based on a frequency analysis of the voltage of the fuel cell stack with the even multiple harmonic components of the rectangular wave frequency.

Figure 5:
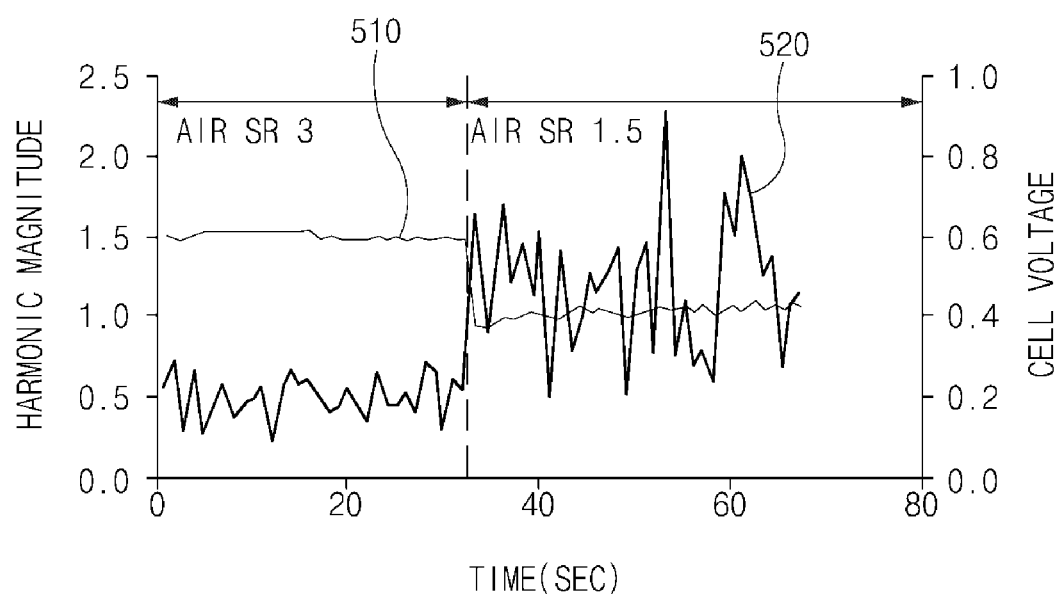
FIG. 5 shows an exemplary diagram illustrating a relationship between the voltage of the fuel cell stack according to an exemplary embodiment of the present invention and a magnitude of a harmonic component.

FIG. 5 is an exemplary graph illustrating a relationship between the voltage of the fuel cell stack according to an exemplary embodiment of the present invention and a magnitude of a harmonic component.

Non-linearity may be represented as the harmonic component at the time of the frequency analysis. As illustrated in FIG. 5, a voltage 510 of the fuel cell stack 10 may be high and a harmonic magnitude 520 may be small during a normal operation section (air SR 3 section) of the fuel cell stack 10. In contrast, the voltage 510 of the fuel cell stack 10 may be small and the harmonic magnitude 520 may be large during the abnormal operation section (air SR 1.5 section) of the fuel cell stack 10.

Accordingly, the state of the fuel cell stack 10 may be diagnosed to be normal or abnormal by determining a threshold for the harmonic magnitude.

Figure 6:
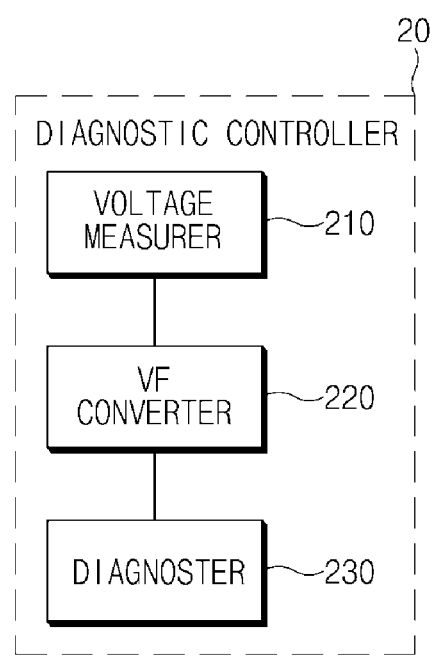
FIG. 6 illustrates an exemplary diagnostic controller of an exemplary apparatus according to an exemplary embodiment of the present invention.

FIG. 6 illustrates an exemplary diagnostic controller according to an exemplary embodiment of the present invention.

As illustrated in FIG. 6, the diagnostic controller according to an exemplary embodiment of the present invention may include a voltage measurer 210, a voltage-frequency converter (VF converter) 220, and a diagnostor 230.

The voltage measurer 210 may measure an output voltage of the fuel cell stack 10.

The VF converter 220 may convert a voltage measured by the voltage measurer 210 into a frequency based on fast-Fourier transform (FFT).

The diagnostor 230 may diagnose the state of the fuel cell stack 10 based on the magnitude of the harmonic component in the frequency converted by the VF converter 220.

As such, the diagnostor 230 may determine that the state of the fuel cell stack 10 is abnormal when the magnitude of the harmonic component is greater than a first threshold. The diagnostor 230 may determine that the state of the fuel cell stack 10 is normal when the magnitude of the harmonic component is not greater than a second threshold. In particular, the first threshold may have a greater value than the second threshold, but the first threshold may be equal to the second threshold.

Figure 7:
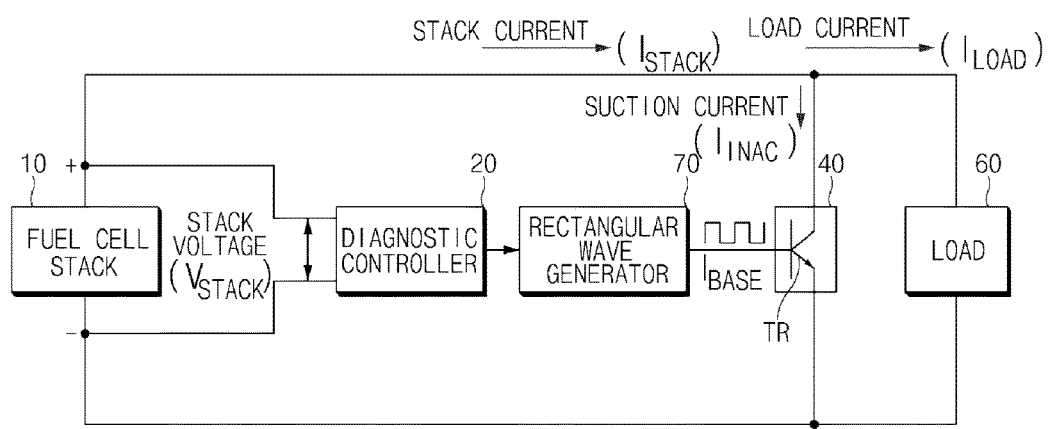
FIG. 7 shows an exemplary apparatus of a fuel cell stack according to an exemplary embodiment of the present invention.

FIG. 7 shows an exemplary apparatus for diagnosing a state of a fuel cell stack according to an exemplary embodiment of the present invention.

As illustrated in FIG. 7, the apparatus for diagnosing a state of a fuel cell stack according to an exemplary embodiment of the present invention includes the fuel cell stack 10, the diagnostic controller 20, the power transistor 40, the load 60, and a rectangular wave generator 70.

The fuel cell stack 10 supplies power to the load 60. As described above, the load 60 refers to a part which is operated by receiving power from a motor, a motor controller, and the fuel cell stack 10 which are included in a fuel cell vehicle, and the like.

The diagnostic controller 20 may determine a frequency and an amplitude value of a rectangular wave.

The rectangular wave generator 70 may generate the rectangular wave under the control of the diagnostic controller 20. In particular, the rectangular wave generator 70 may generate the rectangular wave of the single frequency having the duty ratio of about 0.5.

When the power transistor 40 receives the rectangular wave from the rectangular wave generator 70 through a base B terminal, a current may flow from the collector C to the emitter E or a current may not flow from the collector C to the emitter E.

When the process of applying and cutting off the current by the rectangular wave is repeated, the rectangular wave of the single frequency having the duty ratio of about 0.5 may be applied to the fuel cell stack 10. In particular, the current flowing through the power transistor 40 may be a current in an amplification region of the power transistor 40 and may flow as according to an amplification ratio of the base current.

As such, the power transistor 40 may be an element which is driven depending on a rectangular signal output from the rectangular wave generator 70 or rectangular signal generator 70 such that the rectangular wave current component for diagnosis may be included or overlapped in the current of the fuel cell stack 10 and thus, the diagnostic controller 20 may diagnose the state of the fuel cell stack 10 based on the voltage of the fuel cell stack 10 including the rectangular wave current component passing through the load.

The diagnostic controller 20 may measure the voltage of the fuel cell stack 10 and then convert the measured voltage into a frequency to detect even multiple harmonic component of the rectangular wave frequency and diagnose the state of the fuel cell stack 10 based on a magnitude of the detected harmonic components.

The operation of the diagnostic controller 20 may be the operation of the diagnostic controller 20 as described above.

According to various exemplary embodiments of the present invention, the state of the fuel cell stack may be diagnosed without including the DC-DC converter which boosts the DC voltage and the inverter which converts the boosted DC voltage into the AC voltage. In particular, the state of the fuel cell stack may be diagnosed by applying the rectangular wave of the single frequency having the duty ratio of about 0.5 to the fuel cell stack, measuring the voltage of the fuel cell stack, detecting the even multiple harmonic components of the frequency of the rectangular wave by performing the frequency conversion on the measured voltage, and then diagnosing the state of the fuel cell stack based on the magnitude of the detected harmonic components.

The present invention described above may be variously substituted, altered, and modified by those skilled in the art to which the present invention pertains without departing from the scope and sprit of the present invention. Therefore, the present invention is not limited to the above-mentioned exemplary embodiments and the accompanying drawings

What is claimed is:

1. An apparatus for diagnosing a state of a fuel cell stack, comprising:
    a driver configured to turn on and off a power transistor based on a driving frequency;
    the power transistor driven based on a control of the driver to such that a rectangular wave current component of a single frequency is included in a current of the fuel cell stack; and
    a diagnostic controller configured to set the driving frequency,
    and the diagnostic controller further programmed to measure a voltage of the fuel cell stack, and convert the voltage into a frequency to detect even multiple harmonic components of a rectangular wave frequency, and diagnose a state of the fuel cell stack based on a magnitude of the detected even multiple harmonic components.

2. The state diagnostic apparatus according to claim 1, wherein the diagnostic controller is configured to:
    measure an output voltage of the fuel cell stack;
    convert the measured output into the frequency; and
    diagnose the state of the fuel cell stack based on the magnitude of even multiple harmonic components of the rectangular wave frequency in the converted frequency.

3. The according to claim 1, wherein the diagnostic controller is configured to determine that the state of the fuel cell stack is abnormal when the magnitude of even multiple harmonic components of the rectangular wave frequency is greater than a first threshold, and
    determine that the state of the fuel cell stack is normal when the magnitude of even multiple harmonic components of the rectangular wave frequency is less than a second threshold.

4. The apparatus according to claim 3, wherein the first threshold has a greater value than the second threshold.

5. The apparatus according to claim 1, wherein the rectangular wave current component of a single frequency having a duty ratio of about 0.5.

6. An apparatus of a fuel cell stack, comprising:
    a rectangular wave generator configured to generate a rectangular wave of a single frequency;
    a power transistor configured to be driven based on the rectangular wave output from the rectangular wave generator such that a rectangular wave current component of the single frequency is included in a current of the fuel cell stack; and
    a diagnostic controller configured to set a frequency and an amplitude value of the rectangular wave,
    and the diagnostic controller further programmed to measure a voltage of the fuel cell stack, and convert the voltage into a frequency to detect even multiple harmonic components of a rectangular wave frequency, and diagnose a state of the fuel cell stack based on a magnitude of the detected even multiple harmonic components.

7. The apparatus according to claim 6, wherein the diagnostic controller is conjured to:
    measure an output voltage of the fuel cell stack;
    convert the measured voltage into the frequency; and
    diagnose the state of the fuel cell stack based on the magnitude of even multiple harmonic components of the rectangular wave frequency in the converted frequency.

8. The apparatus according to claim 6, wherein the diagnostic controller is configured to determine that the state of the fuel cell stack is abnormal when the magnitude of even multiple harmonic components of the rectangular wave frequency is greater than a first threshold, and
    determine that the state of the fuel cell stack is normal when the magnitude of even multiple harmonic components of the rectangular wave frequency does is less than a second threshold.

9. The apparatus according to claim 7, wherein the first threshold has a larger greater value than the second threshold.

10. The apparatus according to claim 6, wherein the rectangular wave current component of a single frequency having a duty ratio of about 0.5.

* * * * *